United States Patent
Achleitner et al.

(10) Patent No.: US 7,607,417 B2
(45) Date of Patent: Oct. 27, 2009

(54) METHOD AND SYSTEM FOR CONTROLLING AN INTERNAL COMBUSTION ENGINE

(75) Inventors: Erwin Achleitner, Obertraubling (DE); Martin Cwielong, Regensburg (DE); Gerhard Eser, Hemau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/592,306

(22) PCT Filed: Feb. 4, 2005

(86) PCT No.: PCT/EP2005/050493

§ 371 (c)(1),
(2), (4) Date: Sep. 11, 2006

(87) PCT Pub. No.: WO2005/090769

PCT Pub. Date: Sep. 29, 2005

(65) Prior Publication Data

US 2007/0193558 A1    Aug. 23, 2007

(30) Foreign Application Priority Data

Mar. 15, 2004    (DE) .................. 10 2004 012 489

(51) Int. Cl.
*F02M 63/00*    (2006.01)
(52) U.S. Cl. .................................... 123/447
(58) Field of Classification Search ............. 123/491, 123/478, 527, 179.17, 479, 514, 456, 387, 123/501, 502, 179.21; 701/114
See application file for complete search history.

(56) References Cited

U.S. PATENT DOCUMENTS

| 3,557,765 | A | * | 1/1971 | Nystrom | 123/387 |
| 5,313,924 | A | * | 5/1994 | Regueiro | 123/456 |
| 5,727,525 | A |   | 3/1998 | Tsuzuki | |
| 6,024,064 | A | * | 2/2000 | Kato et al. | 123/179.17 |
| 6,065,446 | A |   | 5/2000 | Engl et al. | |
| 6,755,183 | B2 | * | 6/2004 | Frech et al. | 123/491 |
| 2002/0032516 | A1 | * | 3/2002 | Shimada et al. | 701/114 |
| 2003/0017911 | A1 |   | 1/2003 | Lack | |
| 2003/0204302 | A1 |   | 10/2003 | Amano | |
| 2007/0272213 | A1 | * | 11/2007 | Gibson | 123/446 |

FOREIGN PATENT DOCUMENTS

| DE | 196 12 455 A1 | 10/1997 |
| DE | 102 14 722 A1 | 11/2002 |

* cited by examiner

*Primary Examiner*—Stephen K Cronin
*Assistant Examiner*—Keith Coleman
(74) *Attorney, Agent, or Firm*—King & Spalding L.L.P.

(57) ABSTRACT

A method and system for controlling an internal combustion engine is provide. The engine has a fuel-supply device, a low-pressure circuit and a high-pressure pump, to which a control valve for a volumetric flow is allocated is provided. Said pump is coupled on the inlet side to the low-pressure circuit and transports fuel to a fuel accumulator. An estimated value of the drive torque of the high-pressure pump is determined in accordance with the fuel pressure in the fuel accumulator. A loss torque is determined in accordance with the estimated value for the drive torque of the high-pressure pump and additional loss-torque fractions, which are dependent on a motor speed and additional operating variables. A target torque is determined in accordance with the loss torque and an actuating signal for controlling an actuator of the internal combustion engine is generated from the target torque.

15 Claims, 3 Drawing Sheets

METHOD AND SYSTEM FOR CONTROLLING AN INTERNAL COMBUSTION ENGINE

CROSS REFERENCE TO RELATED APPLICATIONS

This application is the U.S. National Stage of International Application No. PCT/EP2005/050493, filed Feb. 4, 2005 and claims the benefit thereof. The International Application claims the benefits of German application No. 102004012489.2 DE filed Mar. 15, 2004. All of the applications are incorporated by reference herein in their entirety.

FIELD OF INVENTION

The invention relates to a method for controlling an internal combustion engine.

BACKGROUND OF INVENTION

Bearing in mind the increasingly strict statutory regulations on the exhaust emissions of internal combustion engines and because of, at the same time, increasing customer demands with regard to a high driving comfort, internal combustion engines in motor vehicles must be controlled increasingly accurately. Sensors, such as for example temperature sensors, speed sensors, mass air flow sensors or pressure sensors measure the physical operating variables of internal combustion engines, which are processed by a control device. The control device, depending on the measured or derived operating variables of the internal combustion engines by activating different actuators, which for example adjust the throttle valve, the ignition point or the amount of fuel injected, can influence the operating behavior of the internal combustion engine. Above all, the engine torque generated by the internal combustion engine is controlled. Depending on the operating condition of the internal combustion engine, for example, during the starting phase and the warm-up phase, at idling or when accelerating, and depending on the activated comfort functions, such as for example, an air conditioner; different requirements are imposed on the engine torque to be delivered by the internal combustion engine.

A method for determining a target torque at the clutch of a motor vehicle is known from DE 196 12 455 A1. A minimum torque and a maximum torque are determined depending on a loss torque. Depending on a pedal value, the value depending on the angle of an accelerator pedal, on an engine speed and a correcting value of a driving speed regulator, a torque factor is determined. A target torque is determined by using the torque factor from the torque range given by the minimum and the maximum torque, the torque range depending on a loss torque. This target torque is corrected depending on derivative action torques, for example, the idle speed control, a function for heating the catalytic converter or for delimiting bucking vibrations and the loss torque. An actuating signal for a throttle valve actuator is determined as the output variable.

The target torque can be determined even more accurately, the more accurately the individual loss-torque fractions can be determined in each case. It has now been proven that in internal combustion engines with a fuel-supply device which has a high-pressure pump with a control valve for a volumetric flow, the loss torque determined is inaccurate.

SUMMARY OF INVENTION

The object of the present invention is to create a method for the exact control of an internal combustion engine with a high-pressure pump in the fuel-supply device.

This object is achieved in accordance with the features of the independent patent claims. Further embodiments of the invention result from the dependent claims.

The invention relates to a method for controlling an internal combustion engine comprising a fuel-supply device, a low-pressure circuit and a high-pressure pump, to which a control valve for a volumetric flow is allocated. the pump is coupled on the inlet side to the low-pressure circuit and transports fuel to a fuel accumulator. An estimated value of the drive torque of the high-pressure pump is determined in accordance with the fuel pressure in the fuel accumulator. A loss torque is determined in accordance with the estimated value for the drive torque of the high-pressure pump and additional loss-torque fractions, which are dependent on an engine speed and additional operating variables. A target torque is determined in accordance with the loss torque and at least one actuating signal for controlling an actuator of the internal combustion engine is generated from the target torque.

By taking into account the fuel pressure in the fuel accumulator, the accuracy of the determined loss torque increases in a simple manner and in this way allows the engine torque to be adjusted in a better way to the specific operating situation.

The method applies the knowledge that a clear allocation of the operating condition of the high-pressure pump to its drive torque is possible. Over and above that, it applies the knowledge that this allocation depends on the fuel pressure in the fuel accumulator.

In an advantageous embodiment of the invention, the estimated value of the drive torque of the high-pressure pump is in addition determined depending on a variable characterized by the fuel feed flow of the high-pressure pump and the engine speed of the internal combustion engine. In this case, the knowledge is applied that the fuel feed flow adjusted via the control valve for a volumetric flow considerably influences the drive torque of the high-pressure pump and that, in addition, speed-specific frictional losses of the high-pressure pump also occur. By taking into account these additional variables, the accuracy of the estimated value for the drive torque is improved even further.

An additional advantageous embodiment of the invention exists in that a control valve for a volumetric flow and a pressure regulator have been provided for adjusting the fuel pressure in the fuel accumulator. The estimated value for the drive torque of the high-pressure pump is determined depending on whether or not the fuel pressure in the fuel accumulator is actually adjusted by means of the control valve for a volumetric flow and/or the pressure regulator. The method applies the knowledge that the drive torque of the high-pressure pump greatly depends on whether or not the fuel pressure in the fuel accumulator is adjusted via the control valve for a volumetric flow or via the pressure regulator. This has the advantage that the drive torque of the high-pressure pump can be estimated with a high degree of accuracy in the different operating conditions of the internal combustion engines.

A further advantageous embodiment of the invention is characterized in that additional loss-torque fractions are determined from a pump and frictional loss value, a temperature correcting value and an additional load value. The loss torque determined in this way allows an accurate determination of the target torque.

Examples of embodiments of the invention are shown and explained below with reference to drawings. These drawings are as follows:

DETAILED DESCRIPTION OF INVENTION

Elements with the same design and function are labelled in all the figures with the same reference symbols.

Figure 1:
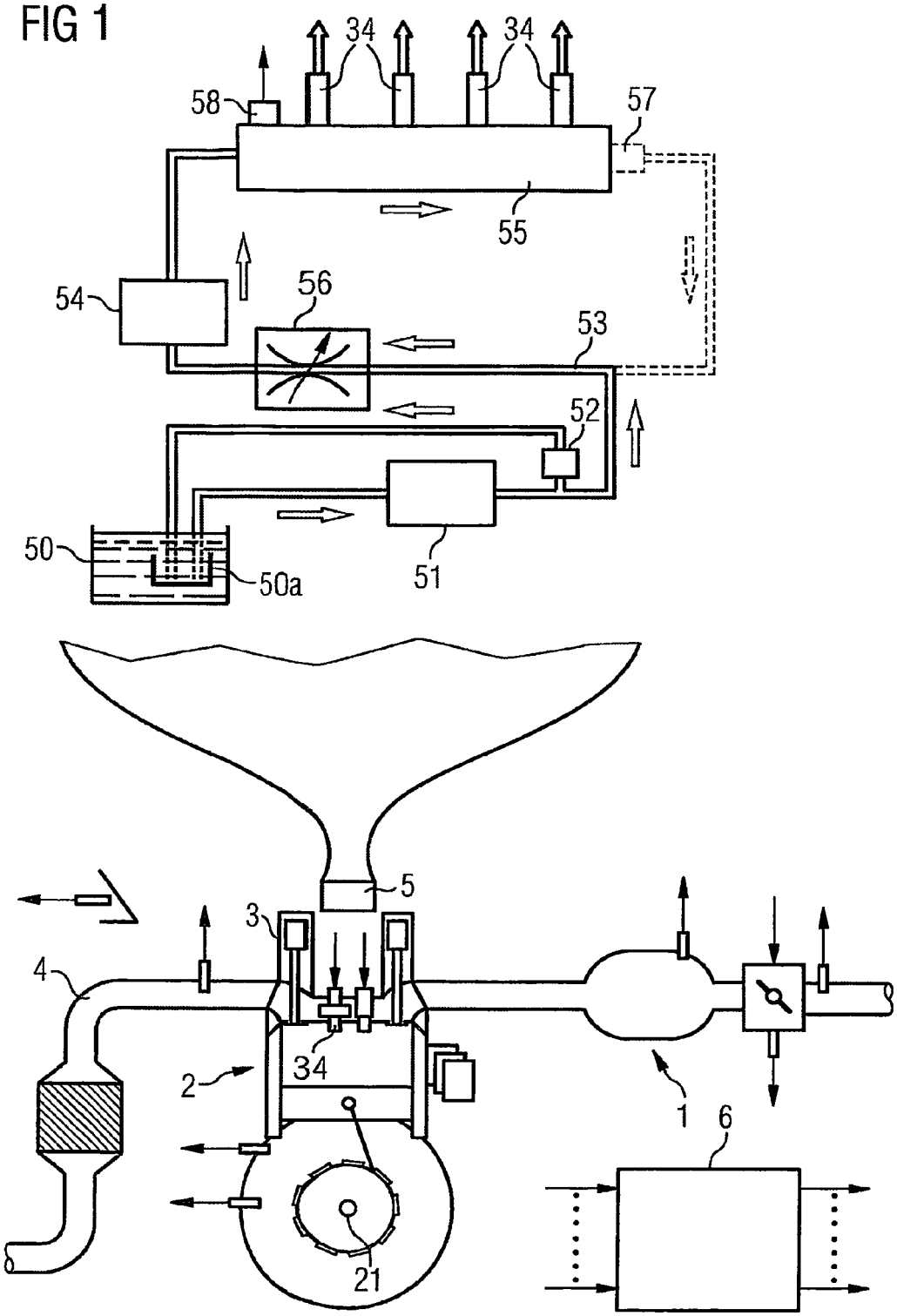
FIG. 1 an internal combustion engine with a fuel-supply device and a control device, FIG. 2 a block wiring diagram of the control device for determining a target torque, a loss torque and correcting variables for controlling an internal combustion engine, FIG. 3 a detailed block wiring diagram for determining the loss torque, FIG. 4 an additional block wiring diagram for determining the drive torque of a high-pressure pump and FIG. 5 an additional block wiring diagram for determining the drive torque of a high-pressure pump in the case of volume regulation.

An internal combustion engine (FIG. 1) comprises an intake tract 1, an engine block 2, a cylinder head 3 and an exhaust gas tract 4. The engine block 2 comprises a number of cylinders, which have pistons and connecting rods by means of which they are connected to a crankshaft 21.

The cylinder head 3 comprises valve drive with a gas intake valve, a gas exhaust valve and valve gears. Furthermore, the cylinder head 3 also comprises both an injection valve 34 and a spark plug.

In addition, a supply device 5 for fuel is provided. It comprises a fuel tank 50, which is connected to a low-pressure pump 51 via a first fuel line. The fuel line opens into a fuel baffle 50a. On the outlet side, the low-pressure pump 51 has an operative connection to an intake 53 of a high-pressure pump 54. In addition, on the outlet side of the low-pressure pump 51, provision is also made for a mechanical regulator 52, which is connected to the fuel tank 50 via an additional fuel line.

The low-pressure pump 51, the mechanical regulator 52, the fuel line, the additional fuel line and the intake 53 form a low-pressure circuit.

The low-pressure pump 51 is preferably embodied in such a way that while the internal combustion engine is operating, it always supplies a sufficient amount of fuel, which guarantees that a given low pressure value does not drop below the required minimum.

The intake 53 leads up to the high-pressure pump 54, which on the outlet side transports fuel to a fuel accumulator 55. The high-pressure pump 54 is usually driven by the camshaft and, thus transports a constant volume of fuel to a fuel accumulator 55 at a constant speed N of the crankshaft 21.

The injection valves 34 have an operative connection to the fuel accumulator 55. This means that the fuel is supplied to the injection valves 34 via the fuel accumulator 55.

In the feed line of the high-pressure pump 54, this means upstream of the high-pressure pump 54, provision is made for a control valve regulating a volumetric flow 56 by means of which the volumetric flow, which is supplied to the high-pressure pump 54, can be adjusted. By controlling the control valve regulating a volumetric flow 56 in a corresponding manner, it can be ensured that a desired fuel pressure P always obtains in the fuel accumulator 55, the pressure being measured with a fuel pressure sensor 58 without it being necessary to provide an electromagnetic pressure regulator 57, on the outlet side of the fuel accumulator 55, with a corresponding return line in the low-pressure circuit.

However, as an alternative, provision can also be made for the internal combustion engine to have an electromagnetic pressure regulator 57 on the outlet side of the fuel accumulator 55 and a corresponding return line in the low-pressure circuit. As an alternative, the control valve for a volumetric flow 56 can be integrated in the high-pressure pump 54 or the pressure regulator 57 can be integrated in the control valve for a volumetric flow 56.

In addition, a control device 6 is provided to which sensors have been allocated, the sensors detecting the different measured quantities and in each case determining the measured value of the measured quantity. The control device 6 determines, in accordance with at least one of the measured quantities, the correcting variables, which are then converted into actuating signals for controlling actuators by means of corresponding actuating drives.

The sensors are a pedal position indicator which detects the position of an accelerator pedal and determines a pedal value PVS, a crankshaft angle sensor which detects a crankshaft angle to which an engine speed N is allocated, a mass air flow meter which detects the mass air flow MAF, the fuel pressure sensor 58 which detects the fuel pressure P in the fuel accumulator 55, a first temperature sensor which detects the temperature of the intake air in the intake tract, a second temperature sensor which detects a temperature TCO of a coolant preferably the cooling water, and a third temperature sensor which detects the temperature TOIL of the engine oil. Depending on the embodiment of the invention, any subset of the sensors or even additional sensors can be made available.

The actuators are for example embodied as gas intake valves or gas exhaust valves, injection valves 34, a spark plug, a throttle valve, a low-pressure pump 51, a control valve for a volumetric flow 56 or even as an electromechanical pressure regulator 57.

The internal combustion engine preferably also has additional cylinders to which corresponding actuators are then allocated.

Figure 2:
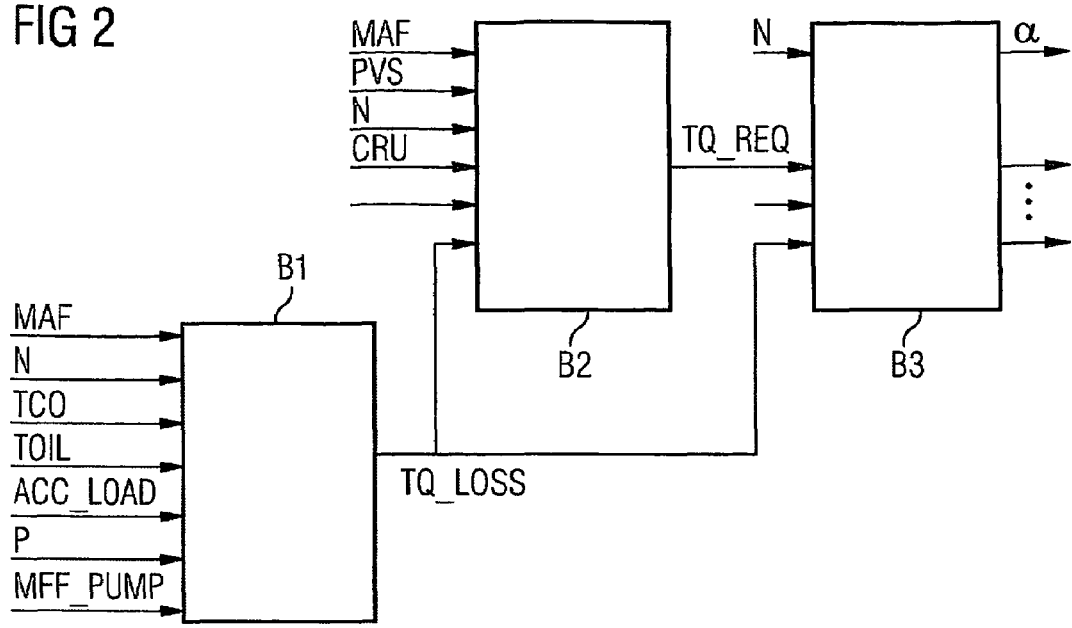

FIG. 2 in a simplified view shows a functional block B1 in which the loss torque TQ_LOSS is determined, a functional block B2 for determining the target torque TQ_REQ and a functional block B3 in which it is possible to determine the actuating signals from the input variables, for example, an opening target value a for a throttle valve for controlling the actuators of the internal combustion engine, such as for example, gas intake valves or gas exhaust valves, injection valves 34 and spark plugs.

The functional block B1 in which the loss torque TQ_LOSS is determined depending on the mass air flow MAF, the engine speed N, the coolant temperature TCO, the engine oil temperature TOIL, an additional load ACC_LOAD, the fuel pressure P and a variable MFF_PUMP characterizing the feed flow of the high-pressure pump, is explained in further detail below. The determined loss torque TQ_LOSS is used as the input variable for both the functional block B2 and the functional block B3. In B2, the target torque TQ_REQ is determined depending on the mass air flow MAF, the pedal value PVS, the engine speed N, preferably on a correcting value of a driving speed regulator CRU and on the loss torque TQ_LOSS. In B3 the correcting variables such as for example the opening target angle α of the throttle valve are determined, amongst others, from the engine speed N, the target torque TQ_REQ and the loss torque TQ_LOSS.

Figure 3:
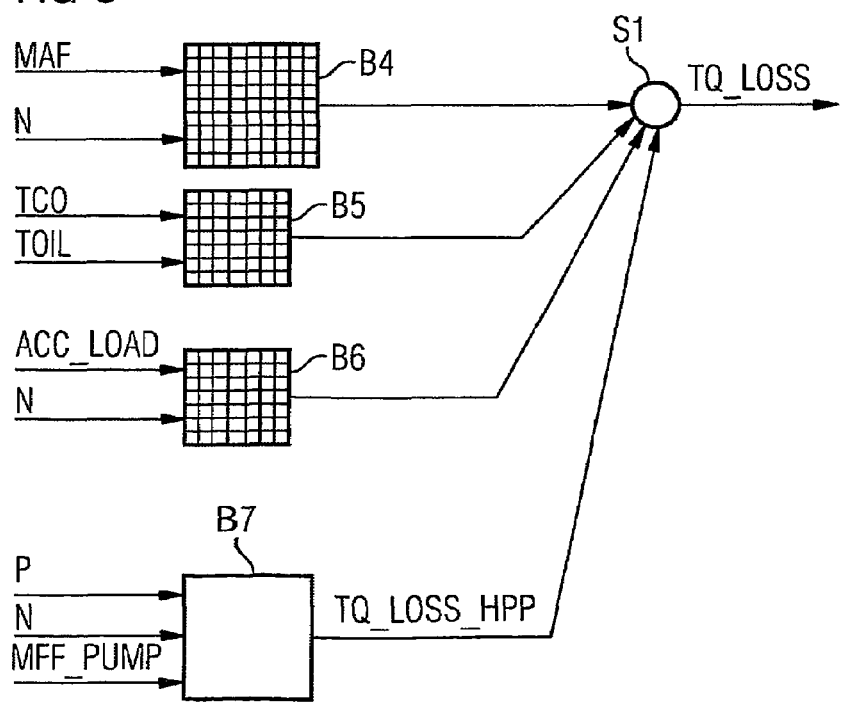

In FIG. 3, functional block B1 of FIG. 2 is shown in detail. In the functional block B4, a value representing the pump and frictional losses, which result from the movement of the piston in the cylinder is determined from the mass air flow MAF and the engine speed N. In a functional block B5, a temperature correcting value is determined which is composed of the coolant temperature TCO and the engine oil temperature TOIL. An additional load depending on the engine speed N and an additional load value ACC_LOAD is determined in a functional block B6. Such an additional load can for example be the compressor of an air conditioning system of a motor vehicle.

Depending on the fuel pressure P in the fuel accumulator 55, the engine speed N and the feed flow of the high-pressure pump MFF_PUMP, an estimated value for the drive torque of the high-pressure pump TQ_LOSS_HPP is determined as a loss-torque fraction TQ_LOSS in a functional block B7. The values determined in the functional blocks B4 to B7 are added up in the summation point S1. The sum forms the loss torque TQ_LOSS.

Figure 4:
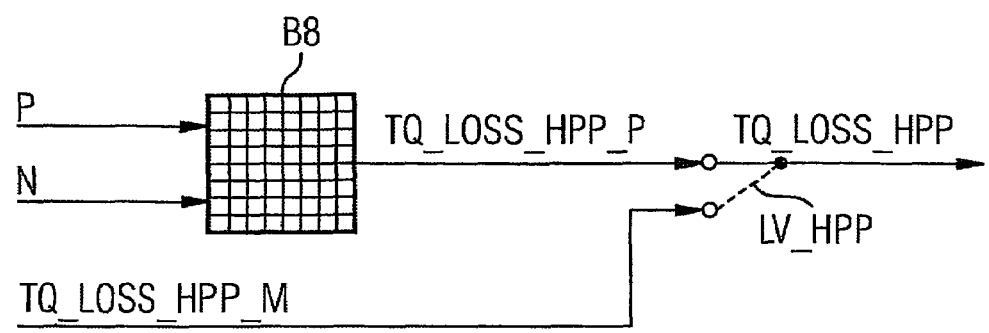

Functional block B7 shown in FIG. 3 is shown in detail in FIG. 4. The estimated value for the drive torque of the high-pressure pump TQ_LOSS_HPP is determined depending on whether the fuel pressure P in the fuel accumulator 55 is actually adjusted by means of the control valve for a volumetric flow 56 or the pressure regulator 57. If the fuel pressure P is adjusted via the control valve for a volumetric flow 56, i.e. via the amount of fuel transported to the fuel accumulator 55 this is called volume regulation. However, as an alternative if the fuel pressure P is adjusted by the controlled draining of fuel from the fuel accumulator 55 via the pressure regulator 57 then this is called pressure regulation. In cases where the adjustment of the fuel pressure P takes place by means of pressure regulation, the estimated value of the drive torque TQ_LOSS_HPP of the high-pressure pump 54 via the switch LV_HPP is the same as the estimated value for the drive torque TQ_LOSS_HPP_P of the high-pressure pump 54 in the case of pressure regulation. The functional block B8 determines the corresponding estimated value for the drive torque TQ_LOSS_HPP_P of the high-pressure pump 54, in the case of pressure regulation, from the input variables, namely the fuel pressure P and the engine speed N. On the other hand, if the fuel pressure P in the fuel accumulator 55 is adjusted by means of volume regulation, then the estimated value for the drive torque TQ_LOSS_HPP of the high-pressure pump 54 via the switch LV_HPP is the same as the estimated value for the drive torque TQ_LOSS_HPP_M of the high-pressure pump 54 in the case of volume regulation.

Figure 5:
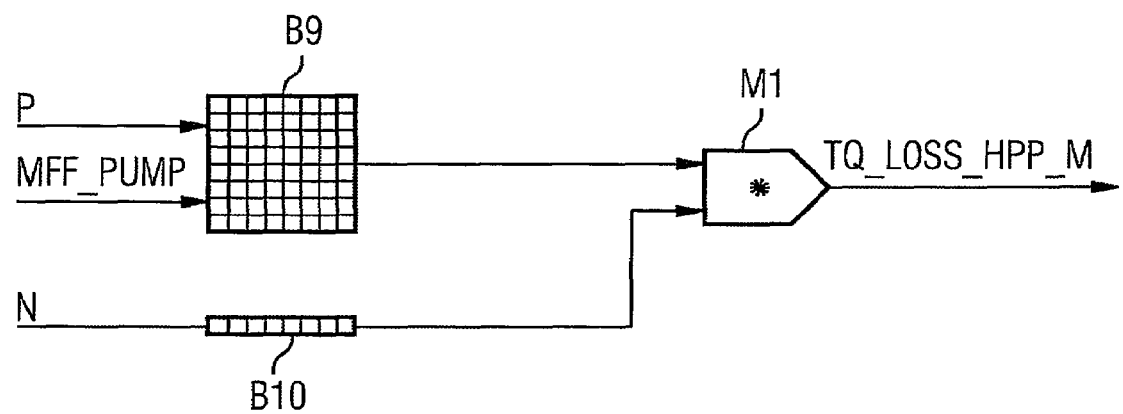

In FIG. 5, the estimated value for the drive torque TQ_LOSS_HPP_M of the high-pressure pump 54, in the case of volume regulation, is determined from the input variables, namely the fuel pressure P, the feed flow MFF_PUMP of the high-pressure pump 54 and the engine speed N. The feed flow MFF_PUMP of the high-pressure pump 54 means a variable that for example depends on the volume of fuel transported by the high-pressure pump 54 or the transported fuel weight, or on the injected volume of fuel or the injected fuel weight. A functional block B9 determines from the fuel pressure P and the feed flow MFF_PUMP of the high-pressure pump 54, an estimated value for the drive torque of the high-pressure pump 54, which in the multiplication point M1 is multiplied by a speed-dependent correcting value determined in a functional block B 10. This correcting value for example allows the taking into account of frictional losses in the high-pressure pump 54, which depend on the engine speed N.

A preferred embodiment for the functional blocks B4 to B6 and B8 to B10 are performance graphs. These performance graphs are preferably initially determined by tests on an engine test bench, by simulations or by drive tests. As an alternative, functions based on physical models can also for example be used.

The changing over shown in FIG. 4 by means of the switches LV_HPP between a pressure regulation operation via the pressure regulator 57 and a volume regulation operation via the control valve for a volumetric flow 56 can for example also be replaced with a suitable weighting of the estimated value fractions for the drive torques TQ_LOSS_HPP_P and TQ_LOSS_HPP_M of the high-pressure pump 54 in the case of a pressure regulation operation and in the case of a volume regulation operation if the fuel pressure P in the fuel accumulator 55 is adjusted both via the control valve for a volumetric flow 56 and the pressure regulator 57.

The invention claimed is:

1. A method for controlling an internal combustion engine having a fuel supply device and an actuator, the fuel supply device being provided with a low-pressure circuit, a high-pressure pump coupled on the inlet side to the low-pressure circuit, which pump transports fuel to a fuel accumulator, and a control valve for a volumetric flow which is allocated to the high-pressure pump, the method comprising:

determining using an electrically-connected control device an estimated value of the drive torque of the high pressure pump depending on the fuel pressure in the fuel accumulator;

determining using the control device a loss torque depending on the estimated value for the drive torque of the high-pressure pump and additional loss-torque fractions, wherein the additional loss-loss torque fractions are dependent on an engine speed and additional operating variables;

determining using the control device a target torque depending on the loss torque; and generating using circuitry an actuating signal for controlling an actuator of the internal combustion engine depending on the target torque.

2. The method according to claim 1, wherein the step of determining the estimated value of the drive torque further comprises, determining the estimated value of the drive torque of the high-pressure pump depending on a variable calculated based on the fuel feed flow of the high-pressure pump and the engine speed of the internal combustion engine.

3. The method according to claim 1, wherein both a control valve for a volumetric flow and a pressure regulator are provided for adjusting the fuel pressure in the fuel accumulator, and wherein the estimated value for the drive torque of the high-pressure is determined depending on whether the fuel pressure in the fuel accumulator is actually adjusted by means of the control valve for a volumetric flow and the pressure regulator.

4. The method according to claim 1, wherein both a control valve for a volumetric flow and a pressure regulator are provided for adjusting the fuel pressure in the fuel accumulator, and wherein the estimated value for the drive torque of the high-pressure is determined depending on whether the fuel pressure in the fuel accumulator is actually adjusted by means of the control valve for a volumetric flow.

5. The method according to claim 4, wherein the estimated value for the drive torque of the high-pressure pump is determined based on variables selected from the group consisting of fuel pressure, feed flow of the high-pressure pump and the engine speed.

6. The method according to claim 1, wherein both a control valve for a volumetric flow and a pressure regulator are provided for adjusting the fuel pressure in the fuel accumulator, and wherein the estimated value for the drive torque of the high-pressure is determined depending on whether the fuel pressure in the hel accumulator is actually adjusted by means of the pressure regulator.

7. The method according to claim 1, wherein the determining additional loss-torque fractions step comprises, determining the additional loss-torque fractions based on values selected from a group consisting of pump and frictional loss value, a temperature correcting value and an additional load value.

8. A system for controlling an internal combustion engine having a fuel accumulator and an actuator, comprising:
   a fuel-supply device coupled with the fuel accumulator and actuator, the fuel-supply device having, a low-pressure circuit, a high-pressure pump coupled on the inlet side to the low pressure circuit, wherein the pump has means for transporting fuel to a fuel accumulator, and a control valve for controlling a volumetric flow allocated to the high-pressure pump; and
   an electrically-connected control device interactively connected with the fuel-supply, actuator and fuel accumulator, comprising,
   sensors for detecting measured quantities in the fuel supply device, fuel accumulator, and the engine,
   means for determining an estimated value of the drive torque of the high-pressure pump depending on the fuel pressure determined in the sensors in the fuel accumulator,
   means for determining a loss torque depending on the estimated value for the drive torque of the high-pressure pump and additional loss-torque fractions, the loss-torque fractions being dependent on measurements from the sensors of an engine speed and additional operating variables,
   means for determining a target torque depending on the loss torque, and
   means for generating an actuating signal for controlling an actuator of the internal combustion engine depending on the target torque.

9. The system according to claim 8, wherein the means for determining the estimated value of the drive torque further comprise means for determining the estimated value of the drive torque of the high-pressure pump depending on a variable calculated based on the fuel feed flow of the high-pressure pump and the engine speed of the internal combustion engine measured by the sensors.

10. The system according to claim 8, wherein the engine comprises, a pressure regulator for adjusting the fuel pressure in the fuel accumulator, and the fuel-supply device sensors comprise means for measuring the fuel pressure in the fuel accumulator based on adjustments in flow from the control valve and the pressure regulator, and the means for determining the estimated value for the drive torque of the high-pressure pump comprises, means for determining the estimated value for the drive torque of the high-pressure pump depending on measurements of the fuel pressure in the hel accumulator based on flow adjustments by the control valve and the pressure regulator.

11. The system according to claim 10, wherein the pressure regulator comprises, an electromagnetic pressure regulator.

12. The system according to claim 8, wherein the means for determining additional loss-torque fractions comprises, means for determining the additional loss-torque fractions based on values measured from the sensors and calculated from values selected from a group consisting of pump and frictional loss value, a temperature correcting value and an additional load value.

13. The system according to claim 8, wherein the low-pressure circuit comprises, a low-pressure pump having means for continuously supplying a predetermined minimum of fuel to maintain a desired low pressure value at or above a minimum value.

14. The system according to claim 8, wherein the additional loss-torque fractions are dependent on measurements from the sensors of an engine speed and additional operating variables selected from the group consisting of mass air flow, coolant temperature, engine oil temperature, additional load, fuel pressure and a variable characterizing the feed flow of the high pressure pump.

15. A system for controlling an internal combustion engine having a fuel accumulator and an actuator, comprising:
   a fuel-supply device coupled with the fuel accumulator and actuator, the fuel supply device having,
   a low-pressure circuit,
   a high-pressure pump coupled on the inlet side to the low-pressure circuit, wherein the pump has means for transporting the fuel to a fuel accumulator, and
   a control valve for controlling a volumetric flow allocated to the high-pressure pump; and
   a control device interactively connected with the fuel-supply, actuator and fuel accumulator, comprising,
   sensors for detecting measured quantities in the fuel supply device, fuel accumulator, and the engine,
   a control device wired to at least one of the sensors and configured to determine an estimated value of the drive torque of the high-pressure depending on the fuel pressure in the fuel accumulator,
   a regulator responsive to at least one sensor signal to selectively regulate the fuel pressure in the fuel accumulator based on at least one of the following: a regulation based on one of at least two different fuel pressure regulating modalities, and a regulation based on a combination of the at least two different fuel pressure regulating modalities, and wherein the estimated value of the drive torque of the high-pressure pump is adjusted based on the selected modality for regulating the fuel pressure in the accumulator;
   a control device wired to at least one of the sensors and configured to determine a loss torque depending on the estimated value for the drive torque of the high-pressure pump and additional loss-torque fractions, the loss-torque fractions being dependent on measurements from the sensors of an engine speed and additional operating variables,
   a control device wired to at least one of the sensors and configured to determine a target torque depending on the loss torque, and
   circuitry configured to generate an actuating signal for controlling an actuator of the internal combustion engine depending on the target torque.

* * * * *